United States Patent
Torrico-Bascopé

(10) Patent No.: US 9,680,395 B2
(45) Date of Patent: Jun. 13, 2017

(54) FIVE-LEVEL PV INVERTER BASED ON A MULTI-STATE SWITCHING CELL

(71) Applicant: Huawei Technologies Co., Ltd., Shenzhen (CN)

(72) Inventor: Grover Victor Torrico-Bascopé, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/957,820

(22) Filed: Dec. 3, 2015

(65) Prior Publication Data

US 2016/0118910 A1   Apr. 28, 2016

Related U.S. Application Data

(63) Continuation of application No. PCT/EP2013/061447, filed on Jun. 4, 2013.

(51) Int. Cl.
  *H02M 3/335*  (2006.01)
  *H02M 7/487*  (2007.01)
  (Continued)

(52) U.S. Cl.
  CPC .......... *H02M 7/487* (2013.01); *H02M 7/537* (2013.01); *H02S 40/32* (2014.12);
  (Continued)

(58) Field of Classification Search
  CPC ............ H02M 1/12; H02M 1/14; H02M 1/32; H02M 3/10; H02M 3/3155; H02M 3/325; H02M 3/335; H02H 7/122
  (Continued)

(56) References Cited

U.S. PATENT DOCUMENTS

2003/0137857 A1* 7/2003 Yamanaka ............ H02M 7/483
                                                                363/132
2009/0244936 A1   10/2009 Falk et al.
(Continued)

FOREIGN PATENT DOCUMENTS

CN   102405588 A   4/2012
CN   102460932 A   5/2012
(Continued)

OTHER PUBLICATIONS

Nabae, A., et al., "A New Neutral-Point-Clamped PWM Inverter," IEEE Transactions on Industry Applications, vol. IA-17, No. 5, Sep./Oct. 1981, pp. 518-523.
(Continued)

*Primary Examiner* — Adolf Berhane
(74) *Attorney, Agent, or Firm* — Conley Rose, P.C.

(57) ABSTRACT

A five-level active neutral-point-clamping inverter for converting a bipolar DC-voltage ($V_{DC+}$ and $V_{DC-}$) to a three-phase AC output voltage, the converter comprising first, second and third input terminals (P, MP, N) and first, second and third output terminals, where the inverter further comprises a first multi-state switching cell (MSSC) comprising three input terminals respectively connected to the input terminals of the inverter and a first output terminal, a second MSSC comprising three input terminals respectively connected to the input terminals of the inverter and a second output terminal and a third MSSC comprising three input terminals respectively connected to the input terminals of the inverter and a third output terminal.

5 Claims, 6 Drawing Sheets

(51) Int. Cl.
*H02S 40/32* (2014.01)
*H02M 7/537* (2006.01)
*H02M 1/12* (2006.01)
*H02M 1/00* (2006.01)

(52) U.S. Cl.
CPC .............. *H02M 2001/0064* (2013.01); *H02M 2001/123* (2013.01); *Y02E 10/56* (2013.01)

(58) Field of Classification Search
USPC .......................... 363/40, 55, 56.01, 123, 131
See application file for complete search history.

(56) References Cited

U.S. PATENT DOCUMENTS

| | | | | |
|---|---|---|---|---|
| 2011/0116293 | A1* | 5/2011 | Tabata | H02M 7/487 363/132 |
| 2012/0092915 | A1 | 4/2012 | Okuda et al. | |
| 2013/0038130 | A1* | 2/2013 | Lai | H02M 7/487 307/80 |
| 2013/0099571 | A1 | 4/2013 | Bremicker et al. | |
| 2014/0226384 | A1* | 8/2014 | Yoshikawa | H02M 7/537 363/131 |
| 2016/0141977 | A1* | 5/2016 | Oka | H02M 7/487 318/504 |
| 2016/0329811 | A1* | 11/2016 | Du | H02M 3/1584 |

FOREIGN PATENT DOCUMENTS

| | | |
|---|---|---|
| CN | 102510231 A | 6/2012 |
| CN | 102918756 A | 2/2013 |
| EP | 2107672 A1 | 10/2009 |
| EP | 2375552 A1 | 10/2011 |
| WO | 2011147117 A1 | 12/2011 |

OTHER PUBLICATIONS

Bhagwat, P., et al., "Generalized Structure of a Multilevel PWM Inverter," IEEE Transactions on Industry Applications, vol. IA-19, No. 6, Nov./Dec. 1983, pp. 1057-1069.

Bascope, G., et al., "Generation of a Family of Non-Isolated Dc-Dc Pwm Converters Using New Three-State Switching Cells," IEEE 31st Annual Power Electronics Specialists Conference, Jun. 18-23, 2000, pp. 858-863.

Calais, M., et al., "Multilevel Converters for Single-Phase Grid Connected Photovoltaic Systems—An Overview," IEEE International Symposium on Industrial Electronics, Jul. 7-10, 1998, pp. 224-229.

Bascope, R., et al., "Multi-state Commutation Cells to Increase Current Capacity of Multi-Level Inverters," IEEE 33rd International Telecommunications Energy Conference (INTELEC), Oct. 9-13, 2011, 9 pages.

Foreign Communication From A Counterpart Application, PCT Application No. PCT/EP2013/061447, International Search Report dated Feb. 12, 2014, 5 pages.

Foreign Communication From A Counterpart Application, PCT Application No. PCT/EP2013/061447, Written Opinion sated Feb. 12, 2014, 6 pages.

Machine Translation and Abstract of Chinese Publication No. CN102510231, Jun. 20, 2012, 8 pages.

Foreign Communication From A Counterpart Application, Chinese Application No. 201380076853.7, Chinese Search Report dated Apr. 6, 2017, 2 pages.

Foreign Communication From A Counterpart Application, Chinese Application No. 201380076853.7, Chinese Office Action dated Apr. 17, 2017, 4 pages.

\* cited by examiner

FIVE-LEVEL PV INVERTER BASED ON A MULTI-STATE SWITCHING CELL

CROSS-REFERENCE TO RELATED APPLICATIONS

This application is a continuation of International Application No. PCT/EP2013/061447, filed on Jun. 4, 2013, which is hereby incorporated by reference in its entirety.

TECHNICAL FIELD

The present disclosure relates generally to power conversion and more particularly to three-phase multi-level inverters for photovoltaic (PV) power systems, uninterruptible power supply systems and alternating current (AC) motor drivers and high-voltage direct current (DC) applications.

BACKGROUND ART

The PV inverter is the key component of PV power systems. This equipment is required to convert the DC power generated by PV panels into AC power systems (DC-to-AC). It can be connected or not to grid-synchronized AC systems. Different converter circuits for single-phase and three-phase systems are often used in PV inverter applications. The existing PV power systems can be with transformer (galvanic isolation) or without transformer (transformer-less). The PV inverter must have low harmonic content in the voltage and current, i.e. provide voltage and current with a low total harmonic distortion, $THD_i$ and $THD_v$, respectively, sent to the AC output power system, and controls the power factor to be close to unity.

The voltage source inverter (VSI) is often used for this purpose, especially at higher power levels. Also, multi-level VSI present lower voltage stress over the active switches, and are hence more suitable for high power levels. The greater the number of voltage levels, the lower is the voltage stress across the switches, and the switching losses are consequently reduced.

The developing trend of the PV inverter is high efficiency, high power density and lower cost. However, achieving high efficiency often results in lower power density, high cost and high weight/volume.

Most of the three-phase inverters found in the market today are based on the three-level neutral-point-clamping (NPC) inverter (also known as I-type) or the three-level active-NPC inverter (also known as T-type), as described in references 1 and 2.

The PV inverter systems are often using the multilevel topologies. Such topologies are described in reference 3.

When high power is being processed, semiconductors such as insulated gate bipolar transistors (IGBTs), Metal-Oxide-Semiconductor Field-Effect Transistors (MOSFETs), gate turn-off thyristors (GTOs), MOS-controlled thyristors (MCT), bipolar junction transistors (BJTs), junction gate field-effect transistors (JFETs), diodes, and others have been the chosen solution for the active switches in the applications found in the industry. However using those devices has been related with many issues that are limiting the efficiency and/or power density, such as current sharing between paralleled devices and reduction of the switching frequency due to the increased commutation losses which increases the weight and the size of the converters.

Another drawback of the existing solutions is the electromagnetic interference (EMI) levels which are too high and require output filter with several stages in order to reduce both common mode (CM) and differential mode (DM) noise, reducing the performance and increasing the volume/cost of the unit. The power factor (PF) is lower and the total harmonic distortion (THD) is higher. Also, the leakage current from PV array to ground is high (more than 300 milliamps (mA)).

The concept of the three-state switching cell is described in reference 4, and an application of this three-state switching cell with the object to increase the current capability of the three-level inverters is described in reference 5.

With this topological circuit it is possible to improve the performance of energy conversion from the PV array input to well-regulated AC output, including the maximum power point tracking (MPPT) functionality. Those topologies are for high current application and high power, with high efficiency compared to all classical three-level NPC inverters with silicon carbide switches. Furthermore, this topology has no limitation and can be used in other applications, such as an uninterruptible power supply (UPS), high-voltage direct current (HVDC) and AC motor drivers.

In PV systems this topological circuit can be applied as inverter to grid-connected or islanded applications with isolation transformer or transformer-less.

Achieving high efficiency in the topological circuits existing in the market today is possible with silicon carbide semiconductors, magnetic components and an amount of heavy/thick copper wires. This is however decreasing the power density and increasing the cost.

If the converter is going to be optimized for high power density, the efficiency will unavoidably be lower and the cost increases.

The choice for optimization in the existing solutions today is either efficiency or high power density, but never both.

With the circuits according to the present disclosure it is however possible to achieve both high efficiency and high power density at a low cost.

SUMMARY OF THE DISCLOSURE

In order to overcome the problems of the prior art inverters, a new topological circuit for PV inverters is presented. With the inverter according to the present disclosure very high efficiency and high power density can be achieved at low costs.

The three-phase three-level neutral-point-clamping inverters is a natural topology for use in high power, high input voltage, and have traditionally been the most used converter for PV inverter application. However, the main drawback of the topologies based on this converter technology, is the bulky output filter required to reduce the total harmonic distortion and the high leakage current of the PV array to ground. This drawback has also been reduced with the topological circuit according to the disclosure.

Paralleling of converters has been the way to solve the demand of increasing DC-AC power systems, but due to current sharing problems and the issues mentioned above, this is not the optimal solution for high efficiency, high power density, low cost and reduced weight.

An approach that is most suitable for high power is using converters with multilevel features for voltage and current instead.

However, no attempts have been made finding topological circuits with higher number of levels than the existing three-level neutral-point-clamping inverter for low voltage grid systems. There are many multilevel topologies for medium and high voltage AC power systems using silicon and silicon carbide switches. With silicon carbide semiconductors the switching frequency can be increased and the reactive components are reduced. However, the driving complexity and the cost are increased.

An important advantage of the multilevel topologies configuration is that the voltage and the current stress on the semiconductors are reduced with the increased number of levels in the converter. This will reduce the required cooling and therefore the size, weight and volume of the unit.

Another important feature of multilevel converters is that the size, weight and volume of the reactive components are substantially reduced compared to the classic neutral-point-clamping converter.

As the novel topological circuit presented in this disclosure is a five-level inverter, the limitations found in the PV inverters used for the industry today have been solved, as described above.

At the same time, the THD, PF and EMI performance of the inverter has been improved in this disclosure, compared to the existing topologies, and therefore the weight, size and volume of the input filter can be further reduced.

On this background, it is an object of the disclosure to provide a novel topological circuit especially suitable for high power, high efficiency, high power density and low cost applications in the art of power electronics for PV power generation systems or others applications where it can be required. Furthermore, the topology can be used in other applications where DC-AC is required, for instance UPS systems, HVDC, motor drivers, etc.

In the five-level topological circuit according to the disclosure, the concept of the three-state switching cell (3SSC) technology has been applied on the PV inverter. As described above, the main characteristics of this circuit are the possibility to achieve high frequency, high efficiency, high power density, and low cost due to the reduction of the losses and avoiding the complexity and the cost using silicon carbide semiconductors.

Due to the built-in characteristics of the three-state switching cell, the peak currents through the semiconductors are lower compared to other topologies and consequently the conduction and switching losses are lower. This allows the use of cost effective semiconductors and smaller heat-sinks which will also reduce the total size of the unit. The semiconductors can be discrete or modules depending of the power level of the application. Silicon carbide semiconductors are avoided to reduce the driving complexity and cost.

Thus according to the present disclosure there is provided a five-level active neutral-point-clamping inverter for converting a bipolar DC-voltage Vdc+ and Vdc− to a three-phase AC output voltage, where the converter comprises first, second and third input terminals P, MP and N and first, second and third output terminals, and wherein the inverter comprises a first multi-state switching cell (MSSC) comprising three input terminals, respectively connected to the input terminals P, MP and N of the inverter and a first output terminal; a second MSSC comprising three input terminals, respectively connected to the input terminals P, MP and N of the inverter and a second output terminal; a third MSSC comprising three input terminals, respectively connected to the input terminals P, MP and N of the inverter and a third output terminal; wherein the output terminal of the first MSSC is connected via an inductor La to the first output terminal of the inverter, the output terminal of the second MSSC is connected via an inductor Lb to the second output terminal of the inverter, and the output terminal of the third MSSC is connected via an inductor Lc to the third output terminal of the inverter; and wherein each respective output terminal of the inverter is connected to the second input terminal MP of the inverter via a respective capacitor Ca, Cb, Cc.

According to an embodiment of a five-level active neutral-point-clamping inverter according to the disclosure, the MSSCs each comprise a separate autotransformer (Ta, Tb, Tc), each separate autotransformer comprising end terminals and an intermediate terminal; wherein switching elements Sa1 and Sa3 are provided between the first input terminal P of the inverter and the first and second end terminals, respectively, of a first of the separate autotransformers Ta and switching elements Sa2 and Sa4 connected between the third input terminal N of the inverter and the first and second end terminals, respectively, of the first separate autotransformer Ta, and switching elements Sa5 and Sa6 are connected between the second input terminal MP of the inverter and the first and second end terminals, respectively, of the first of the separate autotransformers Ta;

and wherein switching elements Sb1 and Sb3 are provided between the first input terminal P of the inverter and the first and second end terminals, respectively, of a second of the separate autotransformers Tb and switching elements Sb2 and Sb4 are connected between the third input terminal N of the inverter and the first and second end terminals, respectively, of the second separate autotransformer Tb, and switching elements Sb5 and Sb6 are connected between the second input terminal MP of the inverter and the first and second end terminals, respectively, of the second separate autotransformer Tb; and wherein switching elements Sc1 and Sc3 are provided between the first input terminal P of the inverter and the first and second end terminals, respectively, of a third of the separate autotransformers Tc and switching elements Sc2 and Sc4 are connected between the third input terminal N of the inverter and the first and second end terminals, respectively, of the third separate autotransformer Tc, and switching elements Sc5 and Sc6 are connected between the second input terminal MP of the inverter and the first and second end terminals, respectively, of the third separate autotransformer Tc.

In the above embodiment of the disclosure, the switching elements Sji are bidirectional in current and unidirectional in voltage for j∈{a,b,c} and i∈{1,2,3,4}, and the switching elements Sji are bidirectional in both current and voltage for j∈{a,b,c} and i∈{5,6}.

According to an embodiment of the disclosure, the switching elements are implemented using semiconductor components as described in more detail in the detailed description of the invention.

BRIEF DESCRIPTION OF THE DRAWINGS

In the following detailed portion of the description, the invention will be explained in more detail with reference to the exemplary embodiments shown in the drawings, in which.

DETAILED DESCRIPTION OF DISCLOSURE

In the following detailed description of the invention an embodiment of a three-phase five-level A-NPC PV inverter according to the teachings of the present disclosure will be described.

Figure 1:
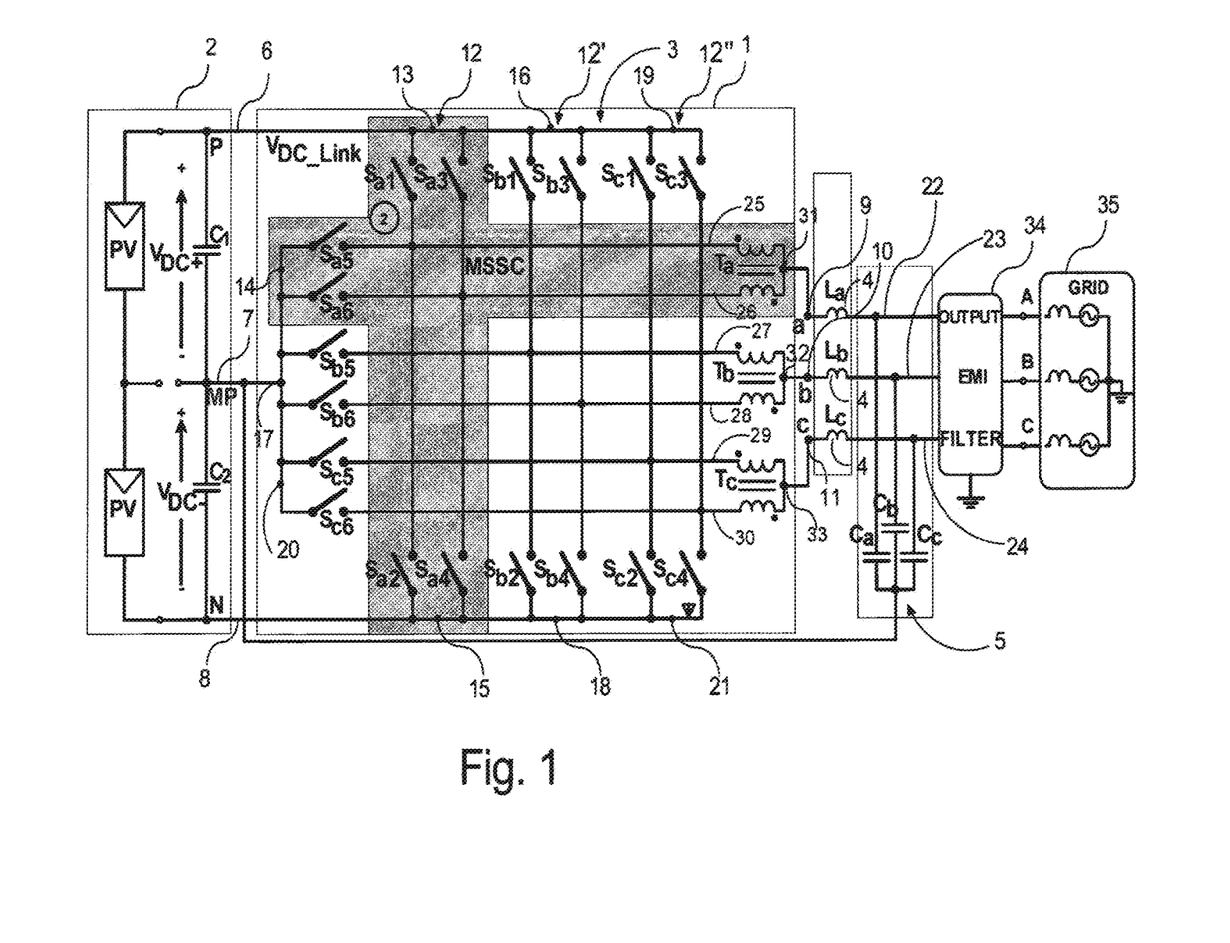
FIG. 1 shows a schematic diagram of an embodiment of a three-phase five-level active neutral-point clamping PV inverter constructed according to the principles of the present disclosure.

Referring to FIG. 1 there is illustrated a schematic diagram of an embodiment of a three-phase five-level active neutral-point-clamping(A-NPC) PV inverter generally indicated by reference numeral 1 constructed according to the principles of the present disclosure. The PV inverter receives input power from any PV array 2 (those connected in series and/or parallel) voltage in parallel with C1 and C2 (those connected in series among P-MP and MP-N) creating a bipolar DC-voltage (Vdc+ and Vdc−) between P-N (total VDC-link). The MSSC T-type, 3, is connected to each phase j (P-MP-N and j=a, b, c) to generate three-phase AC output voltage. The MSSC is constituted by switches Sj1-Sj6 (j=a, b ,c) and an autotransformer Tj. Sj1-Sj4 is for transferring active power from input to AC output power and they are bidirectional in current and unidirectional for voltage. Sj5-Sj6 is for active neutral point clamping to freewheeling the current through inductor and to control the reactive power. They are bidirectional for current and voltage.

The output power goes through inductors Lj, 4, and an output filter 6 to feed the three-phase AC grid 7. The capacitors Cj, 5 are connected in a Y-configuration between the EMI-filter and the inductors Lj to the midpoint input terminal MP, 7, of the inverter. Those capacitors and the output filter are used to minimize the common mode leakage current circulation from the PV array to ground.

The five-level active neutral-point-clamping inverter according to an embodiment of the present disclosure for converting a bipolar DC-voltage (VDC+ and VDC−) to a three-phase AC output voltage shown in FIG. 1 comprises first, second and third input terminals P, MP, N (ref numbers 6, 7 and 8, respectively) and first, second and third output terminals (ref numbers 22, 23 and 24, respectively). The inverter further comprises a first MSSC 12 comprising three input terminals 13, 14, 15 respectively connected to the input terminals P, MP, N of the inverter, and a first output terminal 9.

The inverter further comprises a second MSSC 12' comprising three input terminals 16, 17, 18 respectively connected to the input terminals P, MP, N, respectively, of the inverter, and a second output terminal 10.

The inverter further comprises a third MSSC 12" comprising three input terminals 19, 20, 21 respectively connected to the input terminals P, MP, N, respectively, of the inverter, and a third output terminal 11.

The output terminal 9 of the first MSSC 12 is connected via an inductor La 4 to the first output terminal 22 of the inverter, the output terminal 10 of the second MSSC 2' is connected via an inductor Lb 4 to the second output terminal 23 of the inverter, and the output terminal 11 of the third MSSC 2" is connected via an inductor Lc 4 to the third output terminal 24 of the inverter. Each respective output terminal 22, 23, 24 of the inverter is connected to the second input terminal MP of the inverter via a respective capacitor Ca, Cb, Cc, 5.

The MSSCs used in the embodiment of the disclosure shown in FIG. 1 comprise a separate autotransformer Ta, Tb, Tc for each cell, where each separate autotransformer comprises end terminals 25, 26; 27, 28; 29, 30 and an intermediate terminal 31, 32, 33.

Switching elements Sa1 and Sa3 are provided between the first input terminal 6 (P) of the inverter and the first and second end terminals 25, 26, respectively, of a first of the separate autotransformers Ta, and switching elements Sa2 and Sa4 are connected between the third input terminal 8 (N) of the inverter and the first and second end terminals 25, 26, respectively, of the first separate autotransformer Ta, and switching elements Sa5 and Sa6 connected between the second input terminal 7 (MP) of the inverter and the first and second end terminals 25, 26, respectively, of the first of the separate autotransformers Ta.

Switching elements Sb1 and Sb3 are provided between the first input terminal 6 (P) of the inverter and the first and second end terminals 27, 28, respectively, of a second of the separate autotransformers Tb, and switching elements Sb2 and Sb4 connected between the third input terminal 8 (N) of the inverter and the first and second end terminals 27, 28, respectively, of the second separate autotransformer Tb, and switching elements Sb5 and Sb6 connected between the second input terminal 7 (MP) of the inverter and the first and second end terminals 27, 28, respectively, of the second separate autotransformer Tb.

Switching elements Sc1 and Sc3 are provided between the first input terminal 6 (P) of the inverter and the first and second end terminals 29, 30, respectively, of a third of the separate autotransformers Tc and switching elements Sc2 and Sc4 connected between the third input terminal 8 (N) of the inverter and the first and second end terminals 29, 30, respectively, of the third separate autotransformer Tc, and switching elements Sc5 and Sc6 connected between the second input terminal 7 (MP) of the inverter and the first and second end terminals 29, 30, respectively, of the third separate autotransformer Tc.

The switching elements Sji are in this embodiment bidirectional in current and unidirectional in voltage for j∈{a,b, c} and i∈{1,2,3,4}, and the switching elements Sji are bidirectional in both current and voltage for j∈{a,b,c} and i∈{5,6}.

The switching elements can, for instance, be implemented by means of IGBTs, silicon carbide (SIC) BJTs, MOSFETs or SIC JFETs.

Figure 2A:
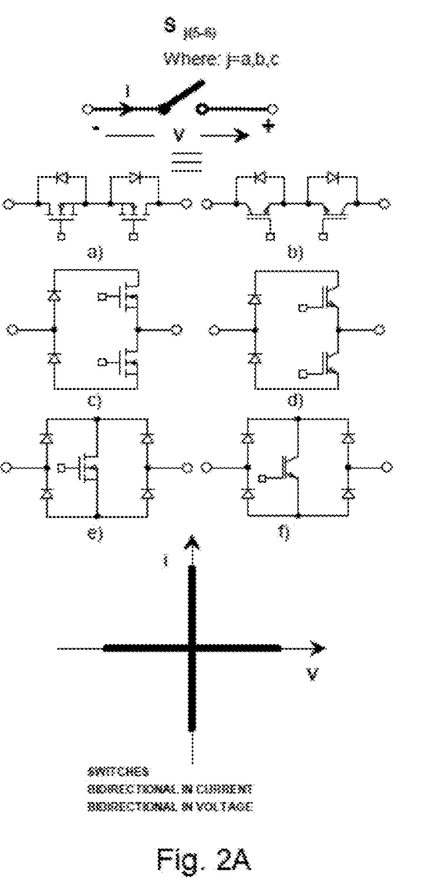
FIG. 2A and FIG. 2B show examples of schematic diagrams of several basic bi-directional switches.
Figure 2B:
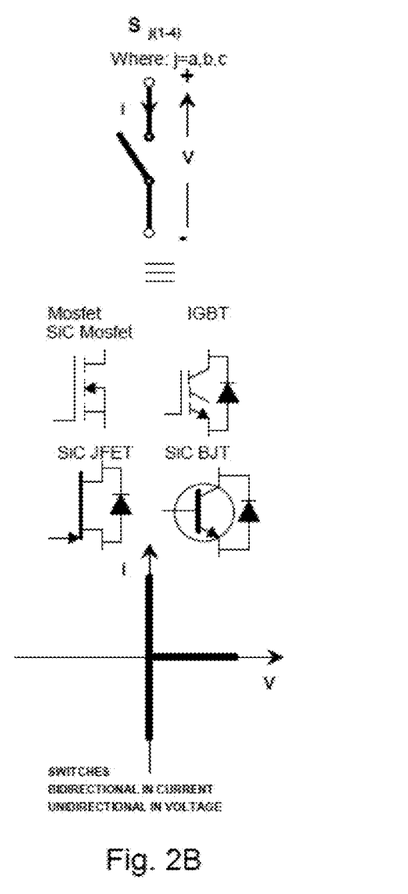

With reference to FIG. 2A and FIG. 2B, there is shown different possible implementations of the switching elements used in the present disclosure, but it is understood that the scope of the present disclosure is not limited to the application of the shown implementations of switching elements. The bidirectional switches in voltage and current Sj5-Sj6 can have for instance the basic formats as indicated in FIG. 2A. The Sj1-Sj4 switches are bidirectional for current and unidirectional for voltage as indicated in FIG. 2B.

The switching elements Sj1-Sj4 can for instance be implemented using the semiconductor configurations shown in FIG. 2B. Thus, for instance, these switching elements can be implemented using a MOSFET or silicon carbide MOSFET, an IGBT with a diode coupled between the source and drain terminals hereof, a silicon carbide JFET with a diode coupled between the source and drain terminals hereof, or with a silicon carbide BJT with a diode coupled between the emitter and collector terminals hereof.

The switching elements Sj5-Sj6 can for instance be implemented using the semiconductor configurations shown in FIG. 2A. A number of alternative configurations are possible, of which some are shown in FIGS. 2A(a) through 2A(f). The configurations (a), (c) and (e) use MOSFETs in various combinations with diodes, whereas the combinations (b), (d) and (f) use IGBTs in similar combinations with diodes.

Figure 3:
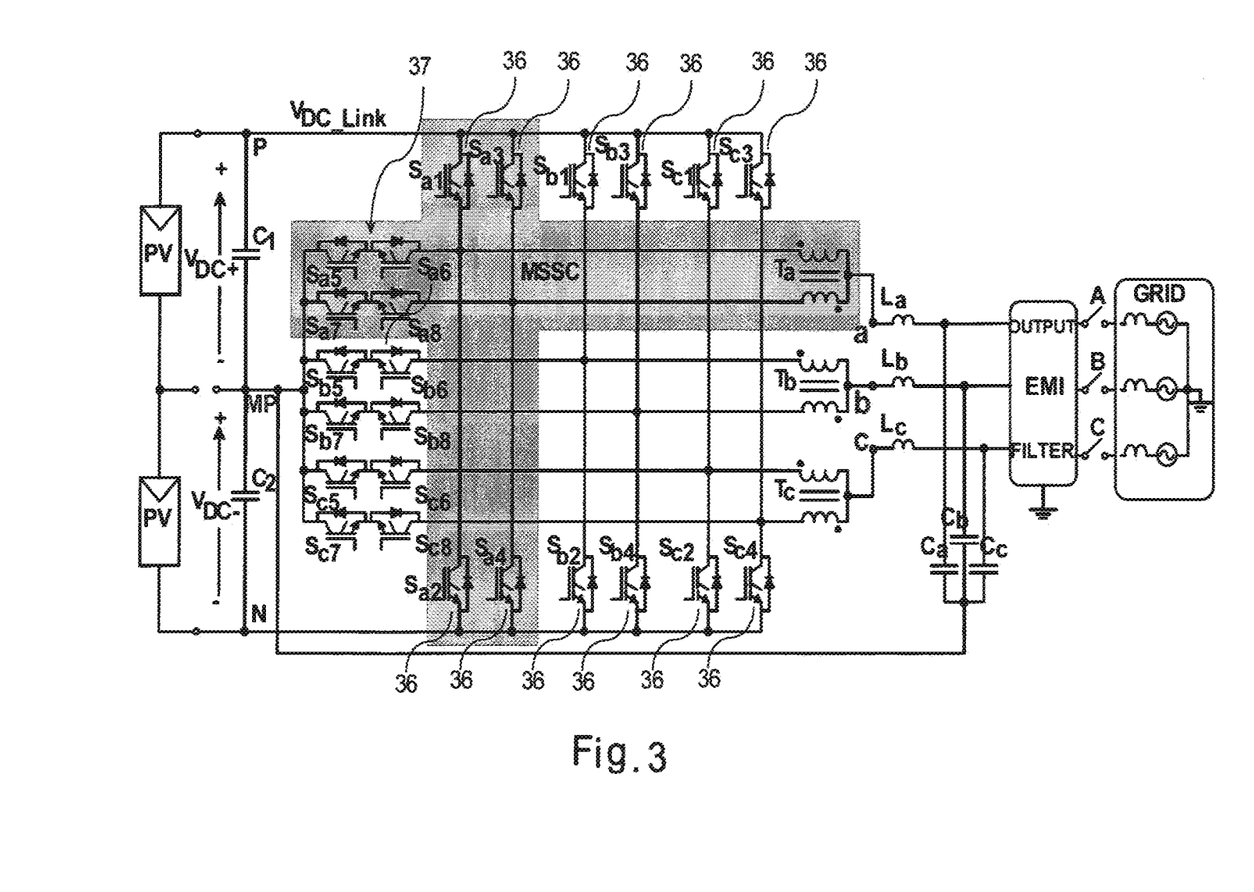
FIG. 3 shows a schematic diagram of the topological circuit of a five-level active neutral-point clamping PV inverter based on multi-state switching cell technology with IGBT transistors constructed according to the principles of the present disclosure.

In FIG. 3 there is shown the application of the five-level topological circuit according to the present disclosure as shown in FIG. 1 with bi-directional switches using IGBT transistors. As mentioned above it is also possible to use other semiconductor configurations for the switches. In the circuit shown in FIG. 3, the switching elements Sji with j∈{a, b, c} and i∈{1, 2, 3, 4} are of the IGBT configuration shown in FIG. 2B, whereas the switching elements Sji with j∈{a, b, c} and i∈{5, 6} are of the corresponding dual IGBT configuration shown in FIG. 2A(b).

Figure 4:
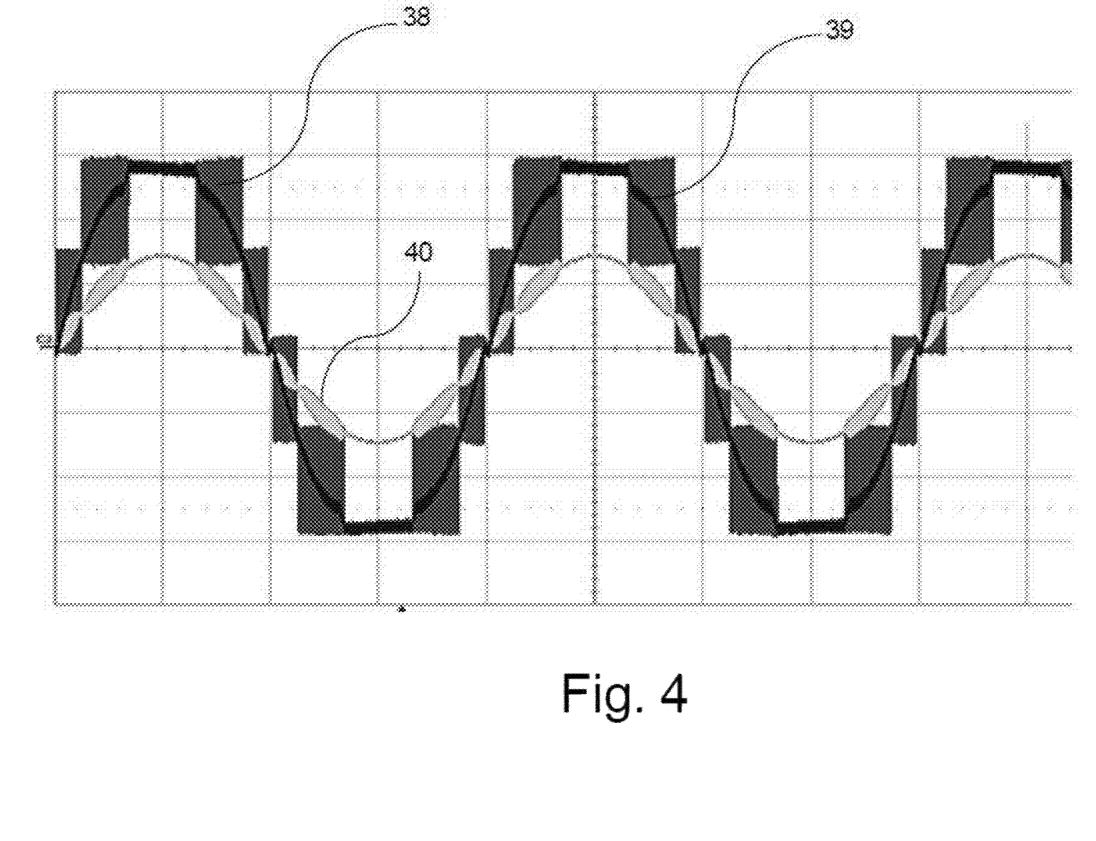
FIG. 4 shows phase A five-level voltage Va-MP before filter (dark gray), phase A voltage Va-MP after filter (black) and phase A current before filter (light gray).
Figure 5:
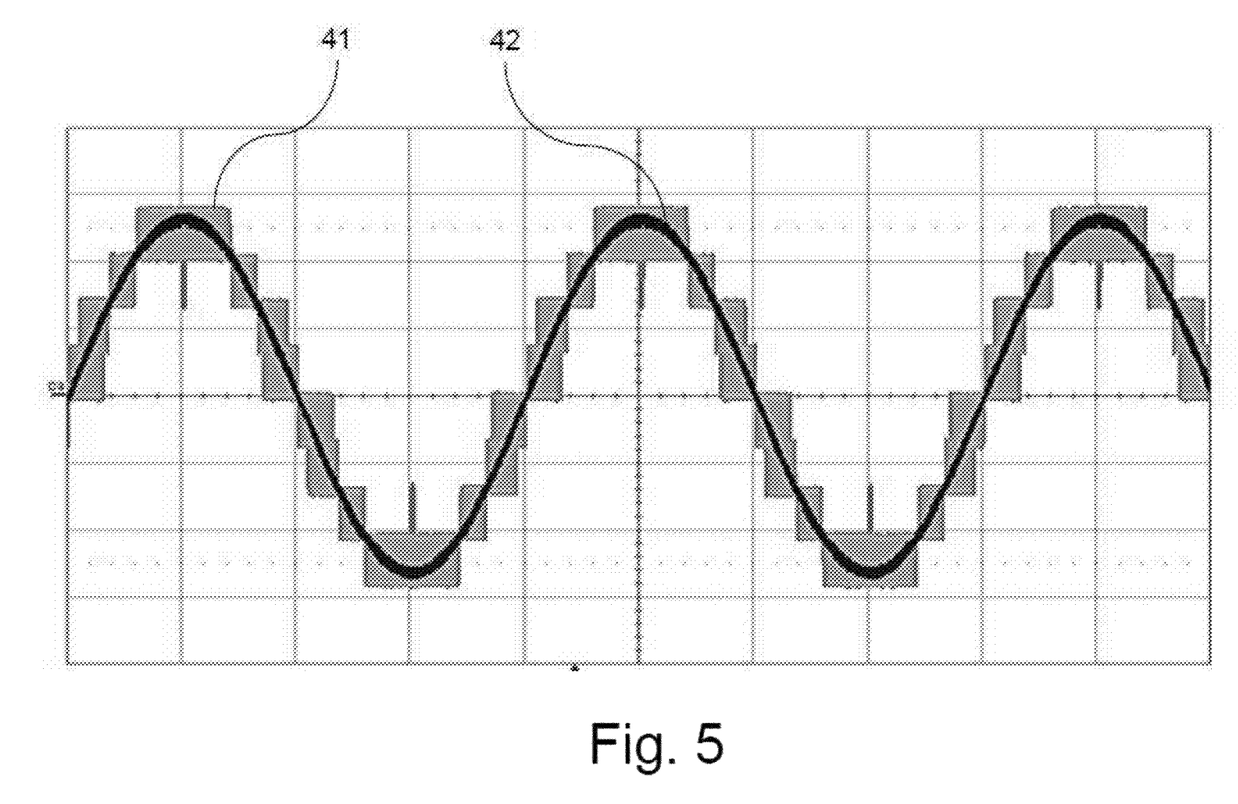
FIG. 5 shows line-to-line nine-level voltage Va-b before filter (light gray) and after filter (black).
Figure 6:
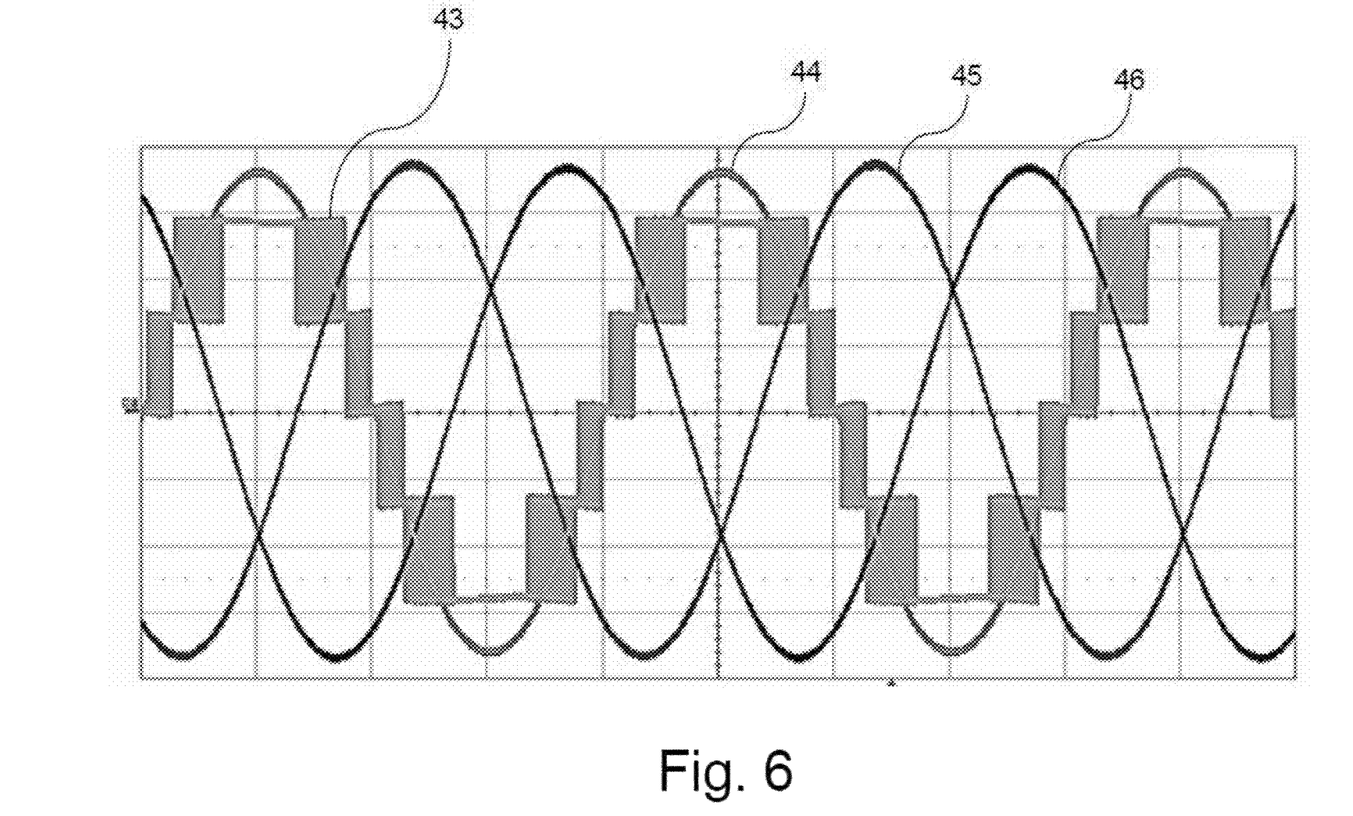
FIG. 6 shows phase A five-level voltage Va-MP before filter (light gray), phase A current after filter, phase B current after filter and phase C current after filter.

Referring to FIGS. 4, 5 and 6 there are shown examples of waveforms from experimental results on the inverter according to the present disclosure to show the multilevel characteristic of the inventive topology presented in FIG. 3 with a Discrete Space Vector Modulation (D-SVM) modulation scheme.

More specifically, FIG. 4 shows phase A five-level voltage Va-MP before filter 38; phase A voltage Va-MP after filter 39; and phase A current before filter 40.

FIG. 5 shows line-to-line nine-level voltage Va-b before filter 41; and after filter 42.

FIG. 6 shows phase A five-level voltage Va-MP before filter 43; phase A current after filter 44; phase B current after filter 45; and phase C current after filter 46. Control Strategy:

For the control of this five-level A-NPC PV inverter based on multi-state switching cell technology, space vector modulation or carrier based control can be implemented together with all their variants.

The current sharing of the each leg of the multi-state switching cell is guaranteed by suitable Pulse Width Modulation (PWM) modulation strategy done by software. This modulation guarantees the voltage-second across autotransformer at every switching cycle. Therefore, the resulting magnetic flux is balanced. If the modulation strategy is not enough to balance the resulting magnetic flux, extra active or passive flux balancing controller which are well known in to state-of-the-art of power electronics can be added.

With the converter circuit according to the present disclosure at least the following highly advantageous effects are obtained: high efficiency without using silicon carbide semiconductors; high frequency operation (>50 kilohertz (kHz)) for any power range with hard-switching semiconductors; high density due to the reduction of the reactive components and the size of the heat-sinks based on the characteristics of the multi-state switching cell topological circuit; high reliability due to the reduced stress on the semiconductors; low EMI-levels and consequently smaller input filter is required; low leakage current from PV array to ground based on the characteristics of the topological circuit and modulation strategy; low cost for high power application impacting in the size as well as the weight and the volume (30 kilowatts (kW) unit feets in the 20 kW box); the circuit is applied for PV system but it can be utilized at other applications where inverter is required, for instance UPSs, AC motor drivers, HVDC, etc.; the circuit in this disclosure can be implemented for any power level as there is no inherent limitation in the topological circuit.

REFERENCES

Ref. 1: [A. Nabae, I. Takahashi, and H. Akagi, "A new neutral-point-clamped PWM inverter," IEEE Trans. Ind. Appl., vol. IA-17, No. 5, pp. 518-523, Sep./Oct. 1981].

Ref. 2: [P. M. Bhagwat, and V. R. Stefanovic, "Generalized Structure of a Multilevel PWM Inverter" IEEE Trans. Ind. Appl., vol. IA-19, No. 6, Nov./Dec. 1983].

Ref. 3: [M. Calais and V. Agelidis, "Multilevel converters for single-phase grid connected photovoltaic systems, an overview," in Proc. ISIE 1998, pp. 172-178.]

Ref. 4: [G. V. T. Bascope e Ivo Barbi, "Generation of a family of non-isolated DC-DC PWM converters using a three-state switching cell", IEEE 31th Annual Power Electronics Specialists Conference, Volume: 2, pp:858-863, 18-23 Jun., 2000]

Ref. 5: [Rene P. T. Bascope Joao A. F. Neto and Grover. V. T. Bascopé,"Multi-state Commutation Cells to Increase Current Capacity of Multi-Level Inverters", Telecommunications Energy Conference (INTELEC), IEEE 33d International, 9-13 Oct. 2011]

What is claimed is:

1. A five-level active neutral-point-clamping inverter for converting a bipolar direct current (DC) voltage (VDC+ and VDC−) to a three-phase alternating current (AC) output voltage, wherein the inverter comprises:
   a first input terminal (P);
   a second input terminal (MP);
   a third input terminal (N);
   a first inverter output terminal;
   a second inverter output terminal;
   a third inverter output terminal;
   a first multi-state switching cell (MSSC) comprising three input terminals respectively connected to the input terminals (P, MP, N) of the inverter and a first MSSC output terminal connected via an inductor (La) to the first inverter output terminal;
   a second MSSC comprising three input terminals respectively connected to the input terminals (P, MP, N) of the inverter and a second MSSC output terminal connected via an inductor (Lb) to the second inverter output terminal; and
   a third MSSC comprising three input terminals respectively connected to the input terminals (P, MP, N) of the inverter and a third MSSC output terminal connected via an inductor (Lc) to the third inverter output terminal,
   wherein each respective output terminal of the inverter is connected to the second input terminal (MP) of the inverter via a respective capacitor Ca, Cb, Cc,
   wherein the first second, and third MSSCs each comprise a separate autotransformer (Ta, Tb, Tc), ach separate autotransformer comprising first and second end terminals and an intermediate terminal,
   wherein switching elements Sa1 and Sa3 are provided between the first input terminal(P) of the inverter and the first and second end terminals, respectively, of a first of the separate autotransformers (Ta), switching elements Sa2 and Sa4 connected between the third input terminal (N) of the inverter and the first and second end terminals, respectively, of the first separate autotransformer (Ta), switching elements Sa5 and Sa6 connected between the second input terminal (MP) of the inverter and the first and second end terminals, respectively, of the first separate autotransformer (Ta), and the intermediate terminal of the first separate autotransfbrmer (Ta) is connected to the first inverter output terminal, wherein switching elements Sb1 and Sb3 are provided between the first input terminal (P) of the inverter and the first and second end terminals, respectively, of a second of the separate autotransformers (Tb), switching elements Sb2 and Sb4 connected between the third input terminal (N) of the inverter and the first and second end terminals, respectively, of the second separate autotransformer (Tb), switching elements Sb5 and Sb6 connected between the second input terminal (MP) of the inverter and the first and second end terminals, respectively, of the second separate autotransformer (Tb), and the intermediate terminal of the second separate autotransformer (Tb) is connected to the second inverter output terminal, wherein switching elements Sc1 and Sc3 are provided between the first input terminal (P) of the inverter and the first and second end terminals, respectively, of a third of the separate autotransformers (Tc), switching elements Sc2 and Sc4 connected between the third input terminal (N) of the inverter and the first and second end terminals, respectively, of the third separate autotransformer (Tc), switching elements Sc5 and Sc6 connected between the second input terminal (MP) of the inverter and the first and second end terminals, respectively, of the third separate autotransformer (Tc), and the intermediate terminal of the third separate autotransformer (Tc) is connected to the third inverter output terminal, wherein the switching elements Sji are bidirectional in current and unidirectional in voltage for $j\epsilon\{a,b,c\}$ and $i\epsilon\{1,2,3,4\}$, and wherein the switching element Sji are bidirectional in both current and voltage for $j\epsilon\{a,b,c\}$ and $i\epsilon\{5,6\}$.

2. The five-level active neutral-point-clamping inverter according to claim 1, wherein the switching elements Sji are one of insulated gate bipolar transistors (IGBTs), silicon carbide bipolar junction transistors (SIC BJTs), Metal-Oxide-Semiconductor Field-Effect Transistors (MOSFETs), and silicon carbide junction gate field-effect Transistors (SIC JFETS).

3. The five-level active neutral-point-clamping inverter according to claim 2, wherein each of the switching elements Sji for $j\epsilon\{a,b,c\}$ and $i\epsilon\{1,2,3,4\}$ is an IGBT comprising emitter and collector terminals connected via a diode, wherein each of the switching elements Sji for $j\epsilon\{a,b,c\}$ and $i\epsilon\{5,6\}$ is a series connection of two IGBTs, the emitter terminals of which are connected to each other, and wherein each of the two IGBTs is provided with a diode between the respective emitter and collector terminals.

4. The five-level active neutral-point-clamping inverter according to claim 1, further comprising an output electromagnetic interference (EMI) filter comprising input terminals and output terminals, wherein the respective input terminals of the EMI filter are connected to the first inverter output terminal, the second inverter output terminal, and the third inverter output terminal of the inverter, respectively and wherein the output terminals of the EMI filter provide output voltages or currents to an AC grid.

5. The five-level active neutral-point-clamping inverter according to claim 1, wherein the inverter is used for one or more of module integrated, string, multi-string, mini central and central photovoltaic (PV) inverter systems.

* * * * *

UNITED STATES PATENT AND TRADEMARK OFFICE
CERTIFICATE OF CORRECTION

PATENT NO. : 9,680,395 B2  
APPLICATION NO. : 14/957820  
DATED : June 13, 2017  
INVENTOR(S) : Grover Victor Torrico-Bascopé

It is certified that error appears in the above-identified patent and that said Letters Patent is hereby corrected as shown below:

In the Claims

Column 9, Line 4, Claim 1 should read:
autotransformer (Ta) is connected to the first inverter Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*